United States Patent [19]
Kimura

[11] Patent Number: 5,905,695
[45] Date of Patent: May 18, 1999

[54] OPTICAL INFORMATION RECORDING/ REPRODUCING APPARATUS AND METHOD CAPABLE OF SELECTING RECORDING WAVEFORM IN CORRESPONDENCE WITH CHARACTERISTICS OF MEDIUM

[75] Inventor: Shunpei Kimura, Yokohama, Japan

[73] Assignee: Canon Kabushiki Kaisha, Tokyo, Japan

[21] Appl. No.: 08/697,565

[22] Filed: Aug. 28, 1996

[30] Foreign Application Priority Data

Aug. 30, 1995 [JP] Japan ................................ 7-221956

[51] Int. Cl.⁶ ........................................... G11B 11/00
[52] U.S. Cl. ................................ 369/13; 369/116
[58] Field of Search .................... 369/116, 13, 54, 369/59, 275.2; 300/59, 114; 365/122

[56] References Cited

U.S. PATENT DOCUMENTS

| | | | |
|---|---|---|---|
| 4,939,717 | 7/1990 | Ohno et al. | 369/116 |
| 5,084,857 | 1/1992 | Miyauchi et al. | 369/116 |
| 5,091,897 | 2/1992 | Otokawa et al. | 369/13 |
| 5,140,580 | 8/1992 | Ohara et al. | 369/116 |
| 5,257,256 | 10/1993 | Terao et al. | 369/116 |
| 5,305,297 | 4/1994 | Nishiuchi et al. | 369/116 |
| 5,396,480 | 3/1995 | Morishita et al. | 369/13 |
| 5,430,696 | 7/1995 | Tokita et al. | 369/13 |
| 5,457,666 | 10/1995 | Toda et al. | 369/13 |
| 5,481,525 | 1/1996 | Saito et al. | 369/116 |
| 5,568,464 | 10/1996 | Horie | 369/116 |
| 5,608,710 | 3/1997 | Minemura et al. | 369/116 |

FOREIGN PATENT DOCUMENTS

| | | |
|---|---|---|
| 0430649 | 6/1991 | European Pat. Off. . |
| 0446892 | 9/1991 | European Pat. Off. . |
| 0725397 | 8/1996 | European Pat. Off. . |
| 4411855 | 10/1994 | Germany . |
| 63-239637 | 10/1988 | Japan . |

*Primary Examiner*—Tan Dinh
*Attorney, Agent, or Firm*—Fitzpatrick, Cella, Harper & Scinto

[57] ABSTRACT

Recording of information is performed by selectively forming a high-temperature level state and a low-temperature level state on a recording medium which is capable of an optical modulation overwrite operation to multi-value power levels on the basis of a multi-pulse recording waveform. A power level PHth of the light beam immediately before the high-temperature level state begins to be formed on the medium is detected and a minimum power level PLmin of the light beam, which can form the low-temperature level state on the medium, is detected. Then, the multi-pulse recording waveform is switched on the basis of the detected power levels PHth and PLmin. Upon recording of a non-overwrite recording medium, a power level Pth of the light beam immediately before recording begins on the medium is detected and a maximum reproduction power level Prmax of the light beam at which information recorded on the medium is not erased is detected. Then, the multi-value recording waveform is switched on the basis of the detected power levels Pth and Prmax.

12 Claims, 13 Drawing Sheets

CASE OF PL=(PLmin+PHth)/2<0.85×PHth (RECORDING WAVEFORM 1)

CASE OF PL=(PLmin+PHth)/2>0.85×PHth (RECORDING WAVEFORM 2)

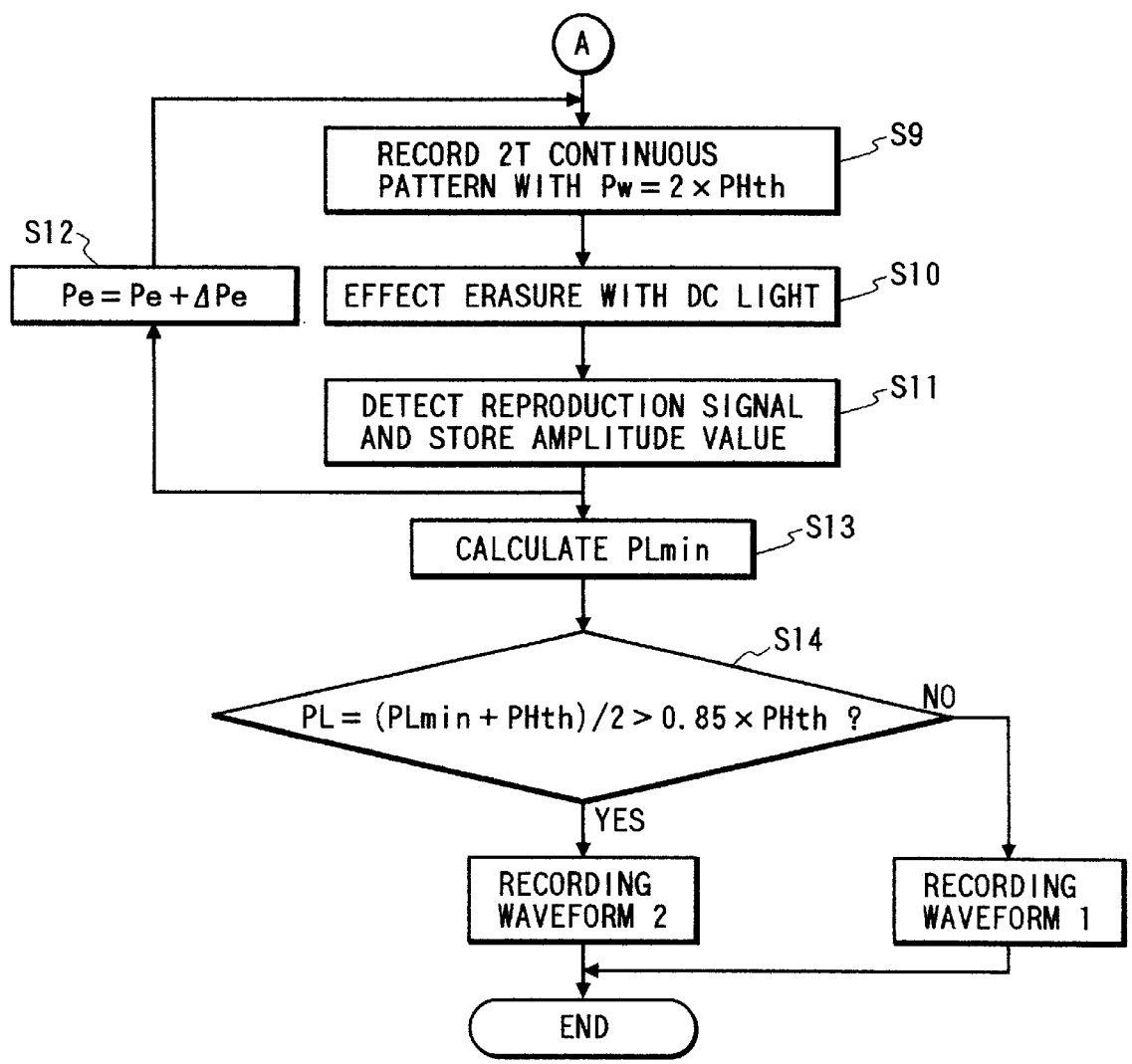

CASE OF Pas=(Prmax+Pth)/2<0.85×Pth (RECORDING WAVEFORM 1)

CASE OF Pas=(Prmax+Pth)/2>0.85×Pth (RECORDING WAVEFORM 2)

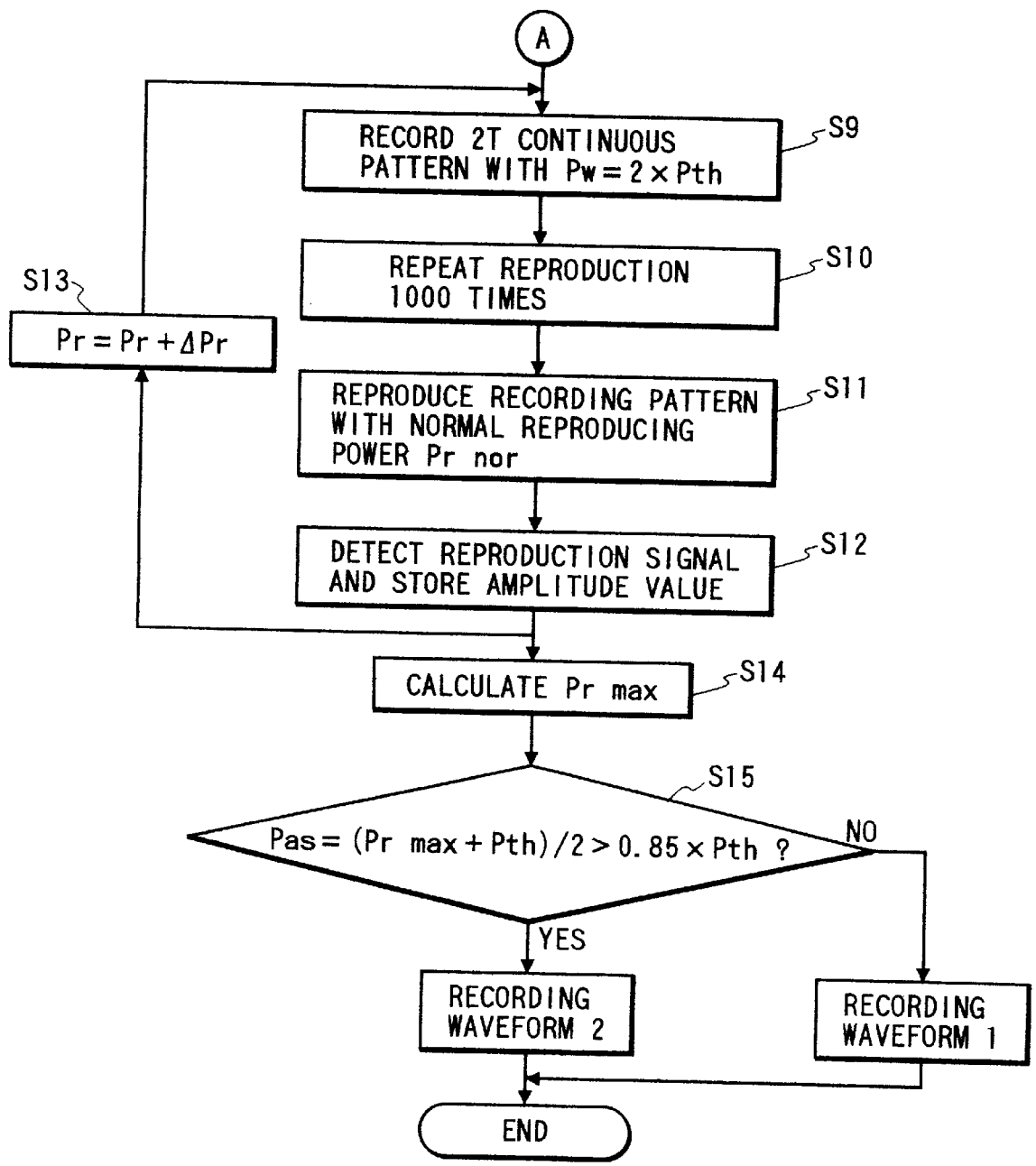

OPTICAL INFORMATION RECORDING/ REPRODUCING APPARATUS AND METHOD CAPABLE OF SELECTING RECORDING WAVEFORM IN CORRESPONDENCE WITH CHARACTERISTICS OF MEDIUM

BACKGROUND OF THE INVENTION

1. Field of the Invention

The present invention relates to an optical information recording/reproducing apparatus for recording information on a recording medium that allows an overwrite operation, and on a non-overwrite medium.

2. Related Background Art

As apparatuses for optically recording information or reproducing information by irradiating a light beam onto an information recording medium, a read-only type apparatus for reproducing information from a read-only recording medium on which information is recorded in advance, a WORM (write once, read many) type apparatus for recording information pits by forming pits on a recording film by heat, an apparatus for changing the crystal state of a medium and recording information as a difference in reflectance, a rewritable type apparatus for recording information pits by changing the direction of magnetization of a perpendicular magnetic film, and the like are available.

FIG. 1 shows the arrangement of a rewritable optical modulation overwrite type magnetooptical disk apparatus of the above-mentioned apparatuses. Referring to FIG. 1, a magnetooptical disk 1 serves as an information recording medium, and is constituted by forming a magnetic film 2 on a transparent substrate such as glass, plastic, or the like. The magnetooptical disk 1 is mounted on the rotation shaft of a spindle motor 3, and is driven to rotate at a predetermined velocity by the spindle motor 3. An optical head 4 is arranged below the lower surface of the magnetooptical disk 1, and a bias magnet 13 is arranged above the upper surface of the disk 1 to oppose the optical head 4. In the optical head 4, a semiconductor laser 5 serving as a recording/reproducing light source is arranged. A light beam emitted by the semiconductor laser 5 is collimated by a collimator lens 6, is transmitted through a polarization beam splitter 7, and is incident on an objective lens 8. The incident light beam is focused by the objective lens 8, and forms a very small (micro) beam spot on the magnetic film 2 of the magnetooptical disk 1. When information is recorded, the light beam emitted by the semiconductor laser 5 is modulated in accordance with an information signal, and is irradiated onto an information track of the magnetooptical disk 1. Also, upon recording information, the bias magnet 13 applies a magnetic field in a predetermined direction to the magnetooptical disk 1, and a series of information pits are recorded by the application of the magnetic field and the irradiation of the light beam.

The light beam irradiated onto the magnetooptical disk 1 is reflected by the medium surface. The reflected light is incident on the polarization beam splitter 7 via the objective lens 8 again, and is reflected toward the beam splitter 9 side by the polarization surface of the splitter 7. In this manner, the light beam is split from the incident light from the semiconductor laser 5. In the beam splitter 9, the incident light beam is split into two light beams. One light beam is received by an optical sensor 11 via a sensor lens 10. The light-receiving signal of the optical sensor 11 is input to an AT•AF circuit (auto-tracking•auto-focusing control circuit) 12. The AT•AF circuit 12 generates a tracking error signal and a focusing error signal on the basis of the light-receiving signal. An objective lens actuator 14 is driven on the basis of the generated tracking error signal and focusing error signal to displace the objective lens 8 in the tracking and focusing directions, thus attaining tracking control and focusing control.

On the other hand, when information recorded on the magnetooptical disk 1 is to be reproduced, a light beam to be emitted by the semiconductor laser 5 is set to have reproduction power lower than recording power, and recorded information is reproduced by scanning the reproduction light beam onto a target track. More specifically, reflected light of the reproduction light beam from the disk surface is received by an optical sensor 16 via the polarization beam splitter 7, the beam splitter 9, and a sensor lens 15. The light-receiving signal of the optical sensor 16 is supplied to a reproduction signal processing circuit (not shown), and is subjected to predetermined signal processing, thereby reproducing the recorded information. Of course, in the reproduction mode, the reflected light of the reproduction light beam is received by the optical sensor 11, and the AT•AF sensor 12 performs tracking control and focusing control based on the light-receiving signal.

The recording process of the optical modulation overwrite method in the apparatus shown in FIG. 1 will be described below. Note that the optical modulation overwrite method is described in detail in, e.g., Japanese Laid-Open Patent Application No. 63-239637. The magnetic film 2 of the magnetooptical disk 1 consists of first and second magnetic layers which are exchange-coupled to each other. The coercive force at room temperature of the first magnetic layer is larger than that of the second magnetic layer, and the Curie temperature of the first magnetic layer is lower than that of the second magnetic layer. When information is recorded on this disk 1, the second magnetic layer with a higher Curie temperature is initialized in one direction, and thereafter, an overwrite operation is performed by intensity-modulating the laser beam from the optical head 4. In this case, the laser beam has two different laser powers, i.e., first and second laser power levels. The first laser power level is a power level (a power level PL that forms a low-temperature level state) which raises the temperature of the disk 1 to the Curie temperature of the first magnetic layer, and the second laser power level is a power level (a power level PH that forms a high-temperature level state) which raises the temperature of the disk 1 to the Curie temperature of the second magnetic layer.

More specifically, a laser beam is modulated between the two different power levels in correspondence with information. When a laser beam having the first laser power level (PL) is irradiated, magnetization of only the first magnetic layer with a lower Curie temperature disappears, and magnetization that appears at the irradiated portion in a later cooling process aligns in a direction stable with respect to the initialized second magnetic layer by exchange coupling with the second magnetic layer with a higher Curie temperature (erasing process). Subsequently, when a laser beam having the second laser power level (PH) is irradiated, magnetizations of the first and second magnetic layers disappear in the irradiated portion, and the magnetization of the second magnetic layer, which appears in a later cooling process, aligns in the direction of the bias magnetic field. The magnetization of the first magnetic layer aligns in a direction stable with respect to the direction of magnetization of the second magnetic layer by exchange coupling, thus recording information (recording process). In this manner, by selecting the first and second laser power levels in correspondence with information, the magnetization of the first magnetic layer aligns in the initialization direction with the first laser power level, and aligns in the direction of the bias magnetic field with the second laser power level, thus recording information. In this manner, the laser beam is controlled between the two different laser power levels, and upon recording, an overwrite operation is allowed independently of the magnetization state of the first magnetic layer before recording.

The magnetooptical disk apparatus described above with reference to FIG. 1 is an apparatus which performs an overwrite operation of the optical modulation method, as described above, and can record information without erasing information, so as to meet the requirement for high-speed information recording. In recent years, in order to record information at high density, pit edge recording that assigns meanings as information to the two edges of a recording pit is becoming popular. However, in such pit edge recording, each recording bit must be formed to have a desired length, and to have a symmetrical shape in its longitudinal direction.

In general, when recording is performed by lighting a laser beam in correspondence with a recording signal itself, each bit formed on the medium has a teardrop shape which widens in the diffusion direction of heat. More specifically, this phenomenon occurs due to thermal interference between adjacent bits, and this means that the method of lighting a light beam in correspondence with the recording signal cannot cope with the above-mentioned pit edge recording. In order to eliminate the influence of thermal interference, as shown in FIG. 2, a method of performing recording using a four-value multi-pulse recording waveform, i.e., a method of performing recording by lighting a laser beam using four power level values has been proposed. FIG. 2 shows, as an example, a laser lighting waveform when a 4T pattern is to be recorded.

Referring to FIG. 2, PL indicates the power level for forming a low-temperature level state (erasure) on a recording layer of an overwrite recording medium such as the above-mentioned magnetooptical disk 1, i.e., for executing an erasing process. When the medium is pre-heated by a light beam with the power level PL, a preheat effect can be obtained. PH1 and PH2 indicate the power levels for forming a high-temperature level state (recording) on the recording layer, i.e., for executing a recording process, and Pr indicates the reproduction power level with a constant value. PH1 is lighted for a 1.5T period, and PH2 is then pulse-lighted at 0.5T intervals. After PH2, a 1.0T cooling period is assured, and this period is normally called a trailing cooling gap. In this manner, in FIG. 2, the laser lighting operation is controlled using four values, i.e., PL, PH1, PH2, and Pr (Pb). The reason why PH2 is pulse-lighted after PH1 is to maintain the temperature of the recording medium to a predetermined value, and to prevent the medium from being overheated.

When the laser lighting operation is controlled in this manner, the above-mentioned influence of thermal interference can be eliminated, and variations in pit edge can be suppressed. Therefore, the laser beam control method shown in FIG. 2 can be suitably used in pit edge recording. Note that FIG. 2 shows the laser lighting waveform of the 4T pattern. Also, patterns with other lengths are formed as follows. When, for example, (1–7) modulation is used as the modulation method of recording data, the shortest bit length is 2T, and the longest bit length is 8T. Therefore, taking (1–7) modulation as an example, in order to form the shortest 2T pattern, only PH1 is lighted after PL in FIG. 2. To form a 3T pattern, PH1 is lighted after PL, and thereafter, only one PH2 pulse (one period of PH2) is lighted. To form a 4T pattern, a laser beam is lighted, as shown in FIG. 2. Similarly, to form 5T, 6T, 7T, and 8T patterns, three, four, five, and six PH2 pulses respectively follow PH1.

When the laser lighting operation is controlled by the above-mentioned control method to record information on an overwrite medium, a single medium may exhibit different recording characteristics depending on different setting values of PL. More specifically, as the value PL is set to be closer to a power level PHth immediately before the high-temperature level state begins, the leading edge of a recording bit becomes less sharp, and such a blunt leading edge increases jitter upon reproduction. This phenomenon occurs since the edge of a recording bit becomes sharper as it undergoes a larger temperature change. Also, the value of PL is determined by the characteristics of a medium to some extent. That is, if the power difference between the power level PHth immediately before the beginning of recording and a minimum erasing power level PLmin at which a recorded bit can be completely erased is small, the value PL must be set to be close to the power level PHth. Therefore, in this case, a sharp leading edge of a recording bit cannot be formed, resulting in large jitter upon reproduction.

On the other hand, if the power difference between the power level PHth immediately before the beginning of recording and the minimum erasing power level PLmin at which a recorded pit can be completely erased is large, the value PL can be separated from PHth. Therefore, in this case, a sharp leading edge of a recording bit is formed, and jitter upon reproduction can also be reduced. In this manner, since the value PL is determined depending on the medium characteristics, a sharp leading edge of a recording bit cannot be formed in a medium with characteristics with a small power difference between PHth and PLmin, resulting in large jitter upon reproduction.

When recording is performed on a non-overwrite medium, the influence of thermal interference can also be eliminated using the four-value multi-pulse recording waveform, as shown in FIG. 2. The laser control method for a non-overwrite medium is the same as that in the above description. For a non-overwrite medium, the power level for pre-heating a medium is called Pas. However, in a non-overwrite medium as well, a single medium has different recording characteristics depending on different values Pas as in an overwrite medium. More specifically, as the value Pas is set to be closer to a power level Pth immediately before the beginning of recording, a sharp leading edge of a recording bit cannot be formed, and jitter upon reproduction increases. This is because the edge of a recording bit becomes sharper as it undergoes a larger temperature change, as in the above-mentioned overwrite medium.

Also, in a non-overwrite medium, the value Pas is determined by the medium characteristics to some extent. More specifically, when the power difference between the power level Pth immediately before the beginning of recording and a maximum reproduction power Prmax at which a recorded pit is not erased is small, the value Pas must be set to be close to the power level Pth immediately before the beginning of recording. However, in this case, since Pas and Pth are close to each other, a sharp edge of a recording bit cannot be formed, resulting in large jitter upon recording. Conversely, when the power difference between the power level Pth immediately before the beginning of recording and the maximum power level Prmax at which a recorded pit is not erased is large, since the value Pas can be set to be separated from Pth, a sharp edge of a recording pit can be formed, and jitter upon reproduction can be reduced. As described above, in a non-overwrite medium as well, since the value Pas is determined depending on the medium characteristics, a medium having characteristics with a small power difference between Pth and Prmax suffers large jitter upon reproduction.

In order to solve the above-mentioned problems of the overwrite and non-overwrite media, a method of assuring a cooling gap before a four-value multi-pulse recording waveform, as shown in FIG. 3, is proposed. More specifically, FIG. 3 shows a laser lighting waveform used when a 4T pattern is recorded, as in FIG. 2. In FIG. 3, by assuring a 0.5T cooling gap (called a leading cooling gap) before PH1, the medium is cooled in advance to obtain an abrupt temperature change of the medium. Therefore, with this method, when an overwrite medium has a small difference between PHth and PLmin and PL must be set to have a value close to PHTh, or when a non-overwrite medium has a small difference between Pth and Prmax and Pas must be set to have a value close to Pth, since the medium is cooled before a bit is formed, an abrupt temperature change is obtained at the leading edge of a bit, and a sharp leading edge of a pit can be formed.

However, conversely, when PL is set to be a value separated from PHth in an overwrite medium, or when Pas is set to be a value separated from Pth in a non-overwrite medium, this method is not suitable in terms of stability of a recording signal since such an unerased portion may remain. That is, in this case, the recording waveform shown in FIG. 2 is suitable. As described above, in the conventional method, when information is recorded on an overwrite or non-overwrite medium using multi-value recording powers, since the recording characteristics vary depending on the medium characteristics, if recording is performed using an unsuitable recording waveform, jitter upon reproduction increases, or an unerased portion undesirably remains.

SUMMARY OF THE INVENTION

The present invention has been made in consideration of the conventional problems, and has as its object to provide an optical information recording/reproducing apparatus and method, which can accurately and stably form a recording bit independently of the medium characteristics, by selecting a recording waveform suitable for the medium characteristics of an overwrite or non-overwrite medium.

In order to achieve the above object, there is provided an optical information recording/reproducing apparatus for recording information by selectively forming a high-temperature level state and a low-temperature level state on a recording medium, which is capable of an optical modulation overwrite operation, upon irradiating, onto the medium, of a light beam, which is intensity-modulated to multi-value power levels on the basis of a multi-pulse recording waveform, comprising:

means for detecting a power level PHth of the light beam immediately before the high-temperature level state begins to be formed on the medium, and a minimum power level PLmin of the light beam, which can form the low-temperature level state on the medium; and means for switching the multi-pulse recording waveform on the basis of the detected power levels PHth and PLmin.

There is also provided an optical information recording/reproducing apparatus for recording information by selectively forming a high-temperature level state and a low-temperature level state on a non-overwrite recording medium upon irradiating, onto the medium, of a light beam, which is intensity-modulated to multi-value power levels on the basis of a multi-pulse recording waveform, comprising:

means for detecting a power level Pth of the light beam immediately before recording begins on the medium, and a maximum reproduction power level Prmax of the light beam, at which information recorded on the medium is not erased; and means for switching the multi-pulse recording waveform on the basis of the detected power levels Pth and Prmax.

There is also provided an optical information recording/reproducing method for recording information by selectively forming a high-temperature level state and a low-temperature level state on a recording medium, which is capable of an optical modulation overwrite operation, upon irradiating, onto the medium, of a light beam, which is intensity-modulated to multi-value power levels on the basis of a multi-pulse recording waveform, comprising the steps of:

detecting a power level PHth of the light beam immediately before the high-temperature level state begins to be formed on the medium, and a minimum power level PLmin of the light beam, which can form the low-temperature level state on the medium; and switching the multi-pulse recording waveform on the basis of the detected power levels PHth and PLmin.

There is also provided an optical information recording/reproducing method for recording information by selectively forming a high-temperature level state and a low-temperature level state on a non-overwrite recording medium upon irradiating, onto the medium, of a light beam, which is intensity-modulated to multi-value power levels on the basis of a multi-pulse recording waveform, comprising the steps of:

detecting a power level Pth of the light beam immediately before recording begins on the medium, and a maximum reproduction power level Prmax of the light beam, at which information recorded on the medium is not erased; and switching the multi-pulse recording waveform on the basis of the detected power levels Pth and Prmax.

The above and other objects and features of the present invention will become apparent from the following detailed description of the embodiments.

DETAILED DESCRIPTION OF THE PREFERRED EMBODIMENTS

Figure 1:
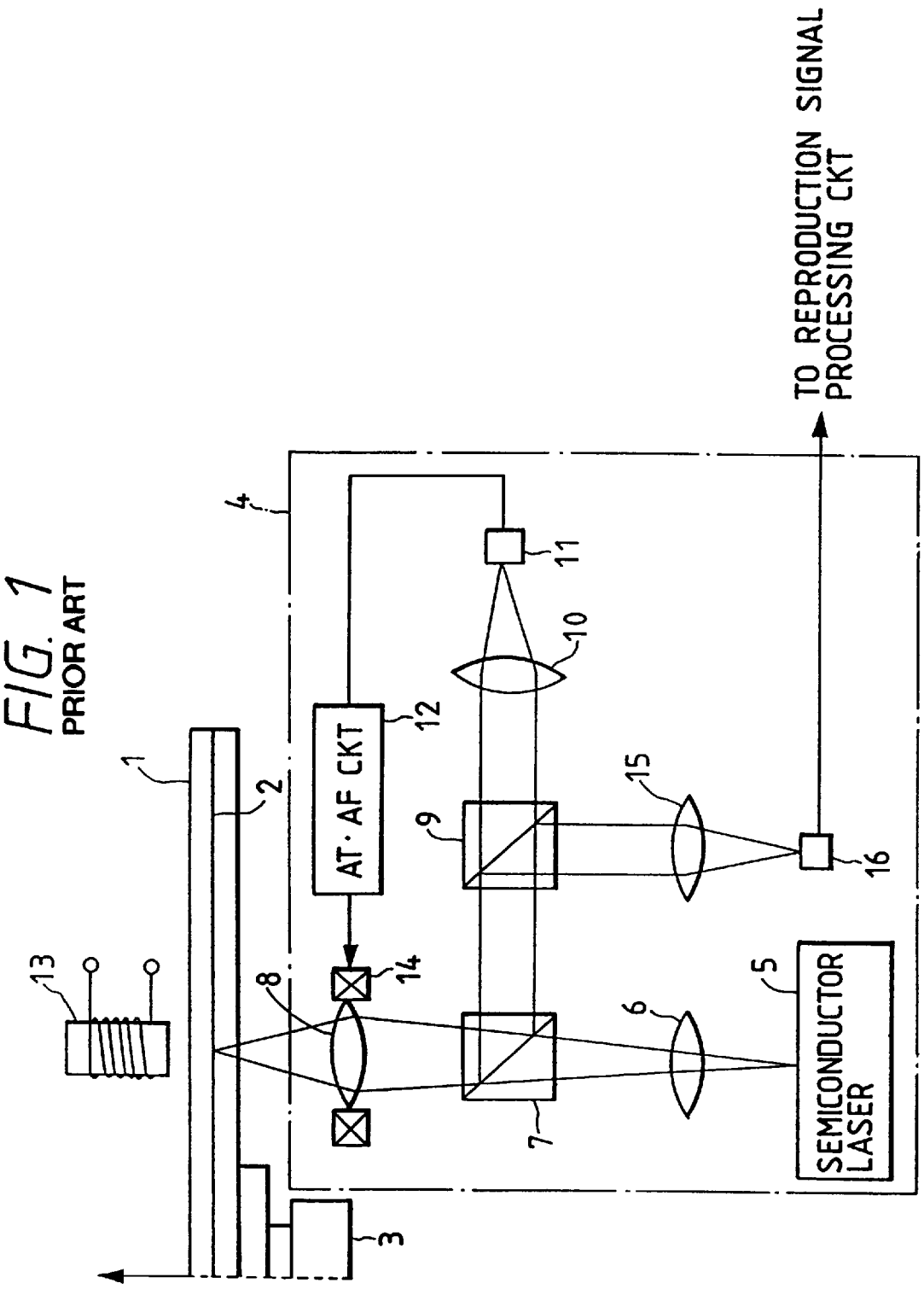
FIG. 1 is a diagram showing a conventional magnetooptical disk apparatus.
Figure 4:
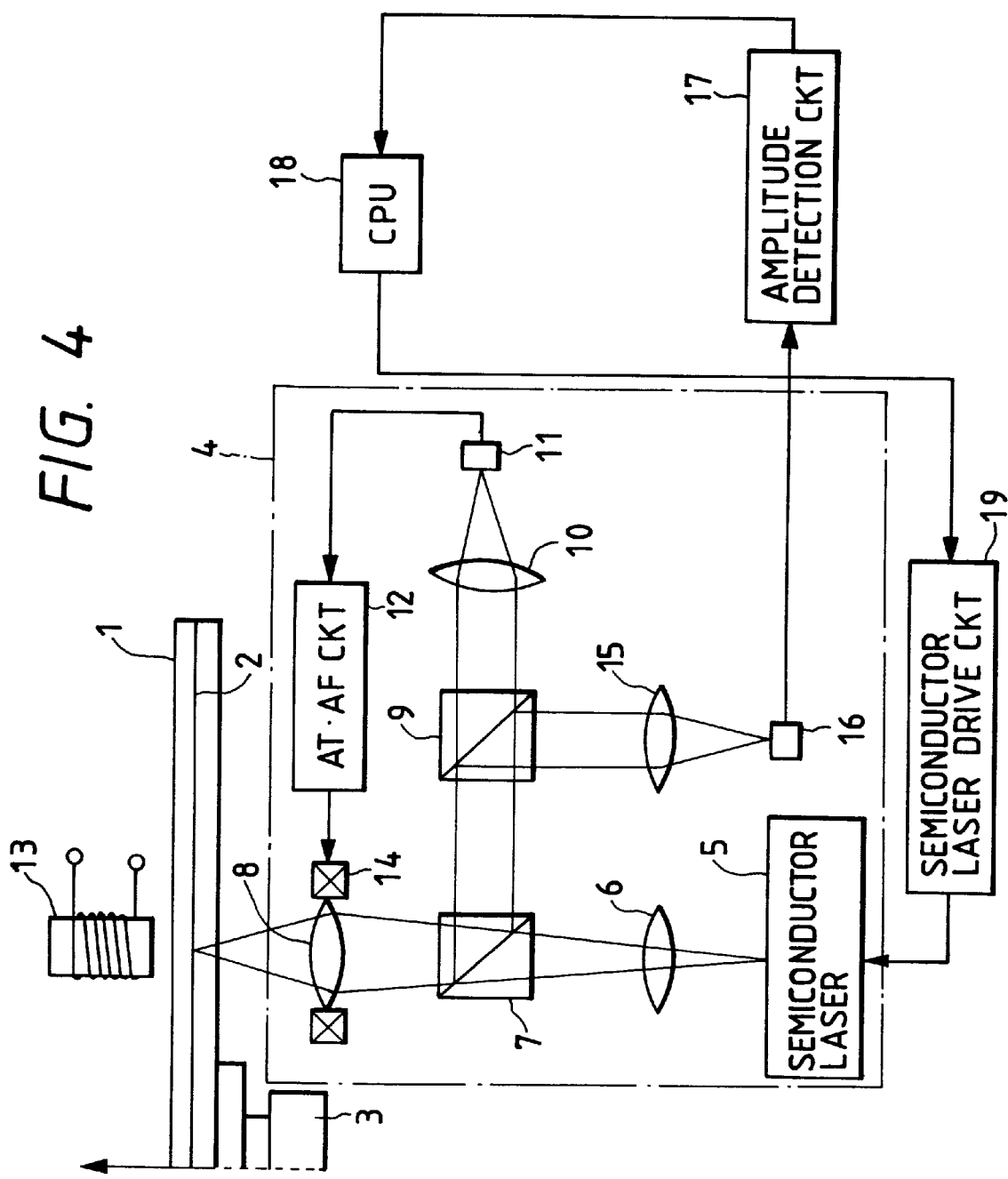
FIG. 4 is a diagram showing the arrangement of an optical information recording/reproducing apparatus according to an embodiment of the present invention.

The preferred embodiment of the present invention will be described in detail hereinafter with reference to the accompanying drawings. FIG. 4 is a diagram showing an embodiment of an optical information recording/reproducing apparatus according to the present invention. Note that the same reference numerals in FIG. 4 denote the same parts as in the conventional apparatus shown in FIG. 1. More specifically, in FIG. 4, a magnetooptical disk 1, a magnetic film 2, a spindle motor 3, and an AT•AF circuit 12 are the same as those shown in FIG. 1. Also, an optical head 4 is constituted by a semiconductor laser 5, a collimator lens 6, an objective lens 8, polarization beam splitters 7 and 9, sensor lenses 10 and 15, optical sensors 11 and 16, and an objective lens actuator 14, and has the same arrangement as that of the optical head 4 shown in FIG. 1. The optical head 4 can access a desired information track while being moved by a mechanism (not shown) in the radial direction of the magnetooptical disk 1. In this embodiment, (1–7) coding is adopted as the modulation method of recording data. When data is recorded on the magnetooptical disk 1, recording data is encoded by (1–7) coding by a CPU 18. A semiconductor laser drive circuit 19 drives the semiconductor laser 5 in correspondence with the encoded recording signal, thereby recording a series of information pits.

In this embodiment, an amplitude detection circuit 17 is arranged to detect the amplitude of a reproduction signal obtained by the optical sensor 16. As will be described in detail later, the amplitude detection circuit 17 is used for detecting a power level PHth immediately before the beginning of a high-temperature level state of the magnetooptical disk 1 or for detecting a minimum erasing power level PLmin at which a recorded bit is completely erased, i.e., which can form a low-temperature level state. The magnetooptical disk 1 shown in FIG. 4 is an overwrite medium. Instead, when a non-overwrite medium is used, the circuit 17 is used for obtaining a power level Pth immediately before the beginning of recording and a maximum power level Prmax at which a recorded bit is not erased. The amplitude value detected by the amplitude detection circuit 17 is supplied to the CPU 18 via an internal A/D converter (not shown) of the CPU 18.

The CPU 18 is a processor circuit serving as a main control unit of the optical information recording/reproducing apparatus of this embodiment, and records information or reproduces recorded information on or from the magnetooptical disk 1 by controlling the respective units such as the AT•AF circuit 12, a drive circuit (not shown) for a bias magnet 13, a drive circuit (not shown) for the spindle motor 3, the semiconductor laser drive circuit 19, and the like. As will be described in detail later, the CPU 18 performs selection control of the lighting waveform of the semiconductor laser 5 in correspondence with the medium characteristics.

Prior to the description of the operation of this embodiment, selection of suitable laser lighting waveforms depending on different medium characteristics will be explained below. Assume that an overwrite medium is used as the recording medium. When information is to be recorded on an overwrite medium, recording is performed using four values, i.e., a power level PL for forming a low-temperature level state (erasure), power levels PH1 and PH2 for forming a high-temperature level state (recording), and a reproduction power level Pr, as described above. The difference between the temperatures for respectively forming low- and high-temperature level states varies depending on the medium characteristics. The difference between the temperatures for respectively forming low- and high-temperature level states can be expressed as the difference between a power level PHth immediately before the beginning of the high-temperature level state and a minimum power level PLmin at which a recorded pit can be completely erased.

Figure 2:
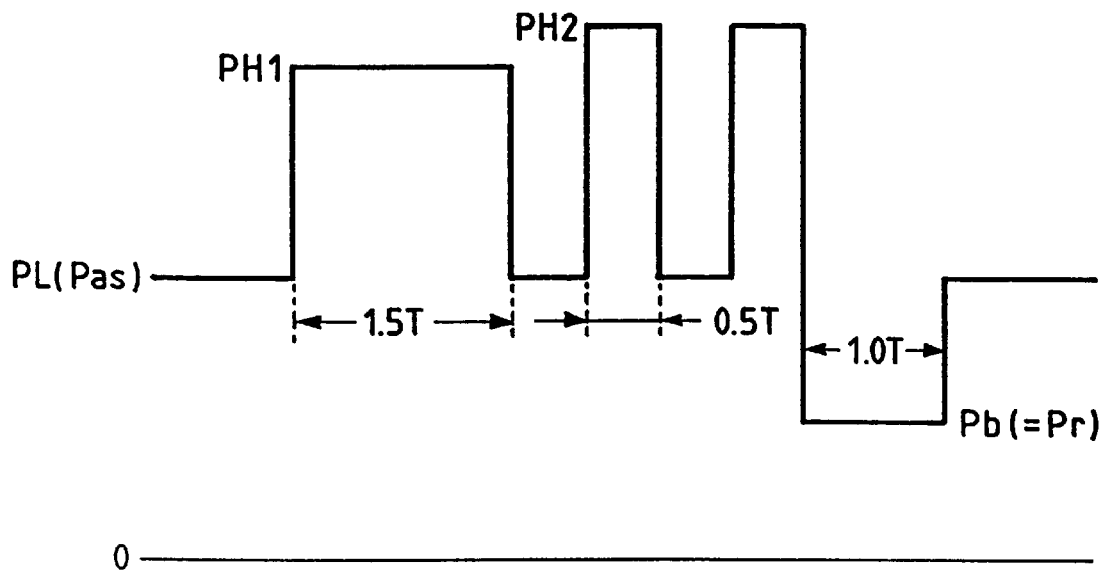
FIG. 2 is a chart showing a recording waveform without any leading cooling gap of a light beam used in conventional four-value recording.
Figure 3:
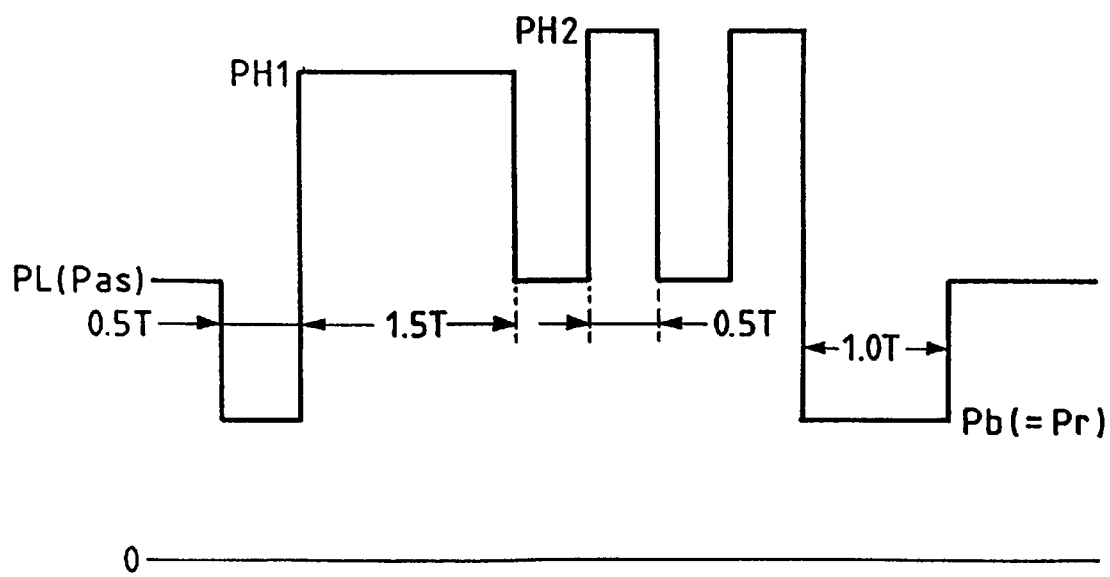
FIG. 3 is a chart showing a recording waveform with a leading cooling gap of a light beam used in conventional four-value recording.

When recording is performed using a four-value multi-pulse recording waveform, as shown in FIG. 2, the value of the power level PL for forming a low-temperature level state is preferably set to be an intermediate value between PLmin and PHth in consideration of laser power variations due to ambient temperature changes, contamination of the medium or an objective lens, and the like. However, when the difference between PLmin and PHth is small, and the value PL becomes relatively close to the value PHth, jitter upon reproduction increases since a sharp leading edge of a recording pit cannot be formed. In this case, a cooling gap is preferably assured before the four-value multi-pulse recording waveform, as shown in FIG. 3. However, as described above, the recording waveform shown in FIG. 3 is effective when the value PL is close to PHTh. When the value PL is separated from PHth, the recording waveform shown in FIG. 2 is more suitable to prevent an unerased portion from remaining.

The present inventors conducted experiments to confirm the combination between the characteristics of overwrite media and recording waveforms. First, using an overwrite medium that satisfies PL>0.85×PHth, a predetermined signal was recorded by the recording waveforms shown in FIGS. 2 and 3, while changing values PH1 and PH2. After recording, the recorded signals were reproduced, jitter components at the leading and trailing edges of each reproduction signal were measured, and the worse one of the measured jitter values at the two edges was plotted. As a result, the results shown in FIGS. 5 and 6 were obtained. The experimental conditions were that the medium linear velocity LV=7.54 m/s (rotational speed=3,000 rpm, the recording radius r=24.0 mm), the reproduction power Pr=1.5 mW, the highest recording frequency=5.9 MHz, the power level PHth immediately before the beginning of the high-temperature level state of the medium was 4.0 mW, and PL was set to be 3.6 mW, which was a value obtained by multiplying PHth with 0.9. Also, in the optical head 4, the wavelength of the semiconductor laser 5 was 680 nm, and the NA of the objective lens 8 was 0.55.

Figure 5:
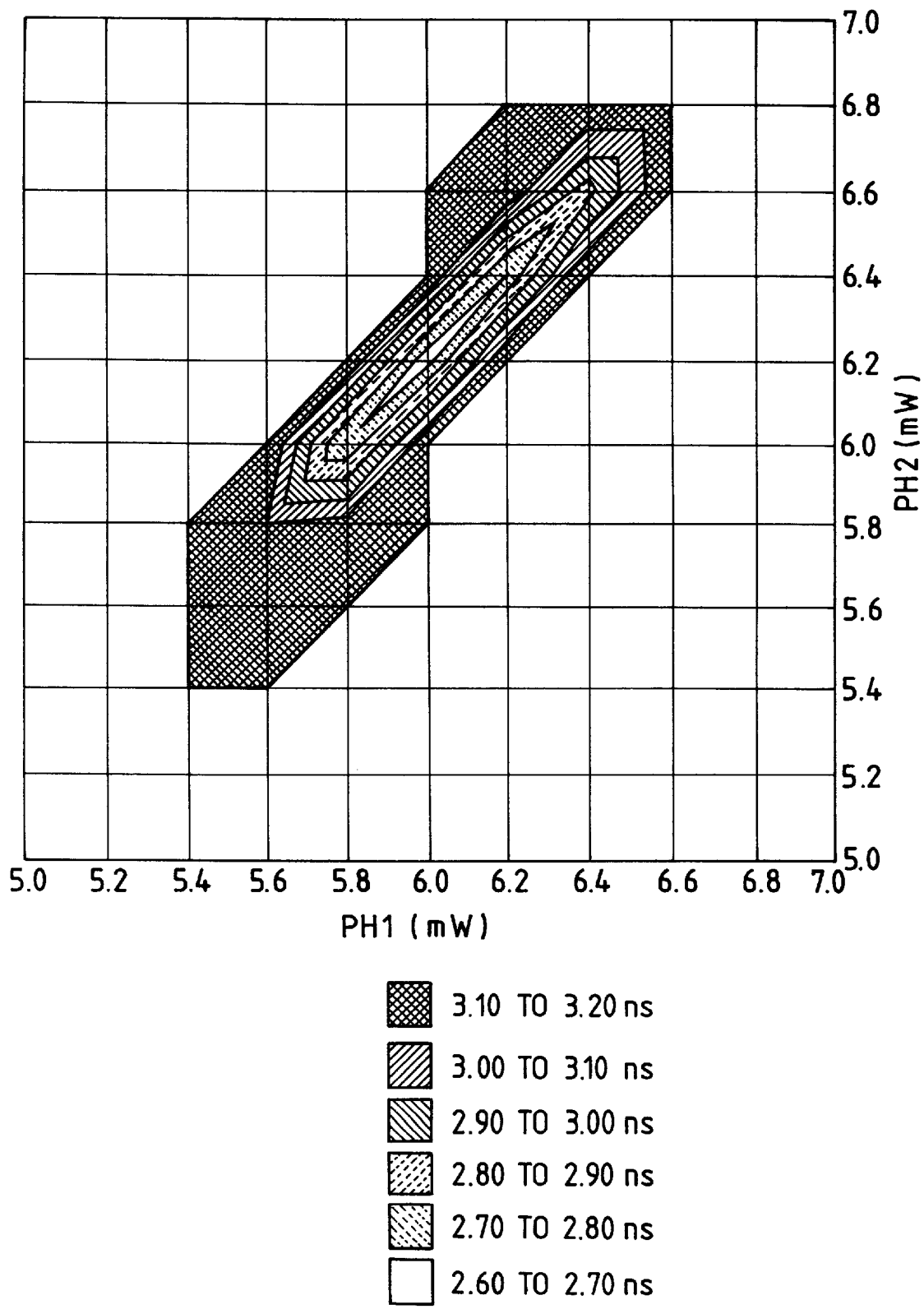
FIG. 5 is a graph showing the measurement results of jitter of a reproduction signal when information is recorded on an overwrite medium using a recording waveform without any leading cooling gap while changing PH1 and PH2.
Figure 6:
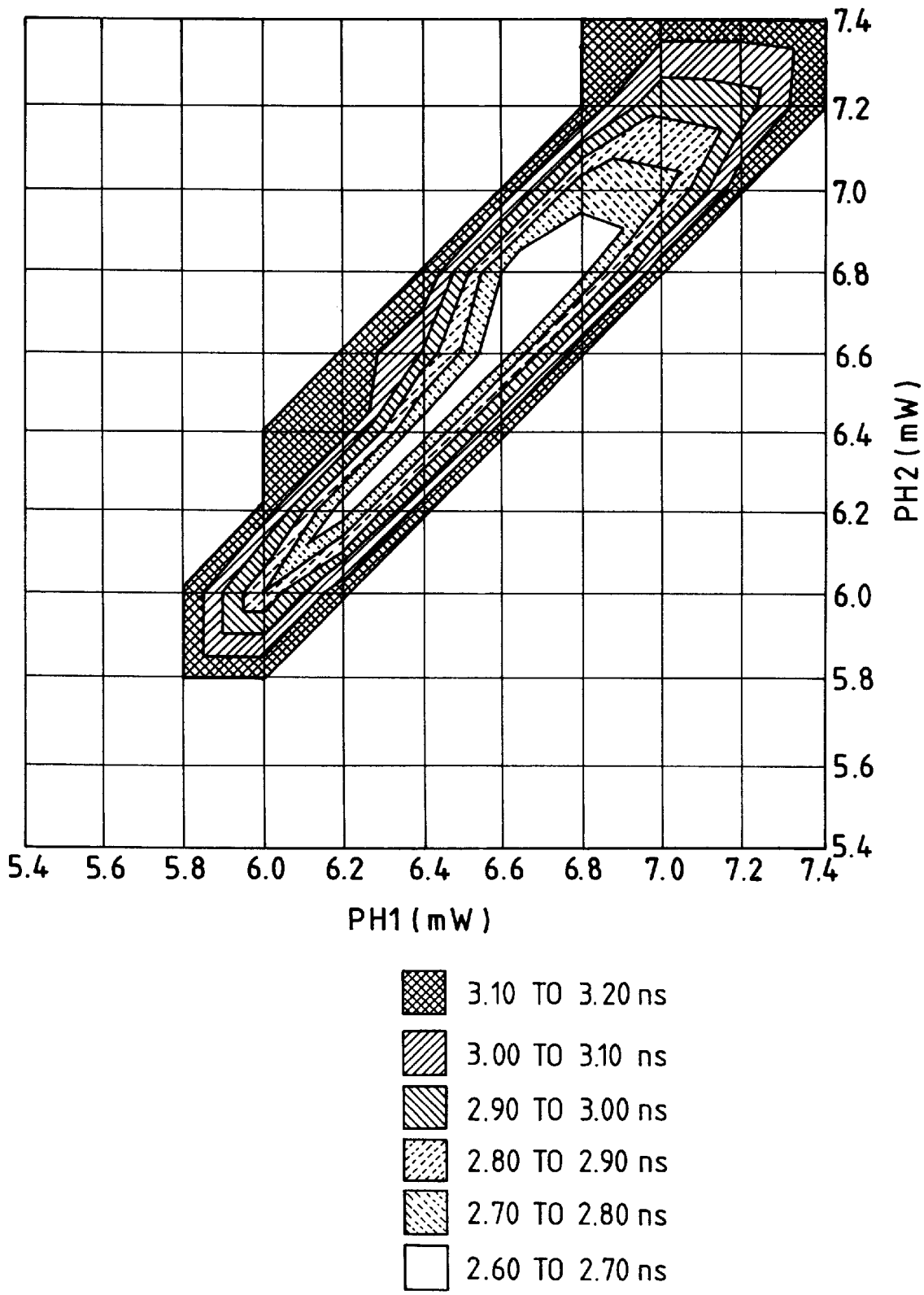
FIG. 6 is a graph showing the measurement results of jitter of a reproduction signal when information is recorded on an overwrite medium using a recording waveform without any leading cooling gap while changing PH1 and PH2.

FIG. 5 shows the experimental results obtained when signals are recorded using a four-value multi-pulse recording waveform without any leading cooling gap, as shown in FIG. 2, and FIG. 6 shows the experimental results obtained when signals are recorded using a four-value multi-pulse recording waveform with a leading cooling gap, as shown in FIG. 3. In FIGS. 5 and 6, the abscissa plots PH1, the ordinate plots PH2, and each position defined by PH1 and PH2 indicates the degree of jitter, i.e., FIGS. 5 and 6 show jitter maps at positions PH1–PH2. More specifically, FIGS. 5 and 6 express jitter components at the positions defined by PH1 and PH2 in the form of, e.g., contour lines, and as the region with a small jitter value is broader, the power margin between PH1 and PH2 is wider.

More specifically, in both FIGS. 5 and 6, six different contour lines of jitter components are used. A contour line corresponding to the largest jitter component has 3.10 to 3.20 ns, and a contour line corresponding to the smallest jitter component has 2.60 to 2.70 ns. Therefore, since the size of the margin between PH1 and PH2 can be determined based on the size of the region within the central contour line corresponding to the smallest jitter component of those in FIGS. 5 and 6, a recording waveform suitable for themedium characteristics can be determined with reference to this region. More specifically, the small jitter region in FIG. 6 is broader than that in FIG. 5, and this fact may be construed to suggest that the power margin in the medium with characteristics that satisfy PL>0.85×PHth becomes larger when the recording waveform with a leading cooling gap, as shown in FIG. 3, is used, so as to attain optimal recording.

Subsequently, using an overwrite medium that satisfies PL<0.85×PHth, unerased portions were measured when overwrite recording was performed using a four-value multi-pulse recording waveform without any leading cooling gap shown in FIG. 2, and a four-value multi-pulse recording waveform with a leading cooling gap shown in FIG. 3. More specifically, a random pattern was initially written using recording powers higher by 20% than the optimal power levels PH1 and PH2, thereafter, signals were overwritten on the random pattern at the optimal recording powers PH1 and PH2, the recorded signals were reproduced, and the jitter components of reproduction signals were measured. The measurement conditions were that the medium linear velocity LV=7.54 m/s (rotational speed=3,000 rpm, the recording radius r=24.0 mm), the reproduction power Pr=1.5 mW, the highest recording frequency=5.90 MHz, the power level PHth immediately before the beginning of the high-temperature level state of the medium was 4.0 mW, and PL was set to be 3.6, mW which was a value obtained by multiplying PHth with 0.9, as in the above-mentioned experiments. Also, in the optical head 4, the wavelength of the semiconductor laser 5 was 680 nm, and the NA of the objective lens 8 was 0.55.

As the experimental results, the jitter value of a reproduction signal recorded using the four-value multi-pulse recording waveform without any leading cooling gap shown in FIG. 2 is better by a few fractions of ns than that recorded using the four-value multi-pulse recording waveform with a leading cooling gap shown in FIG. 3. As can be seen from the above-mentioned experimental results, the recording waveform with a leading cooling gap shown in FIG. 3 is suitable for an overwrite medium that satisfies PL>0.85× PHth, and the recording waveform without any leading cooling gap shown in FIG. 2 is suitable for an overwrite medium that satisfies PL<0.85×PHth.

Figure 7:
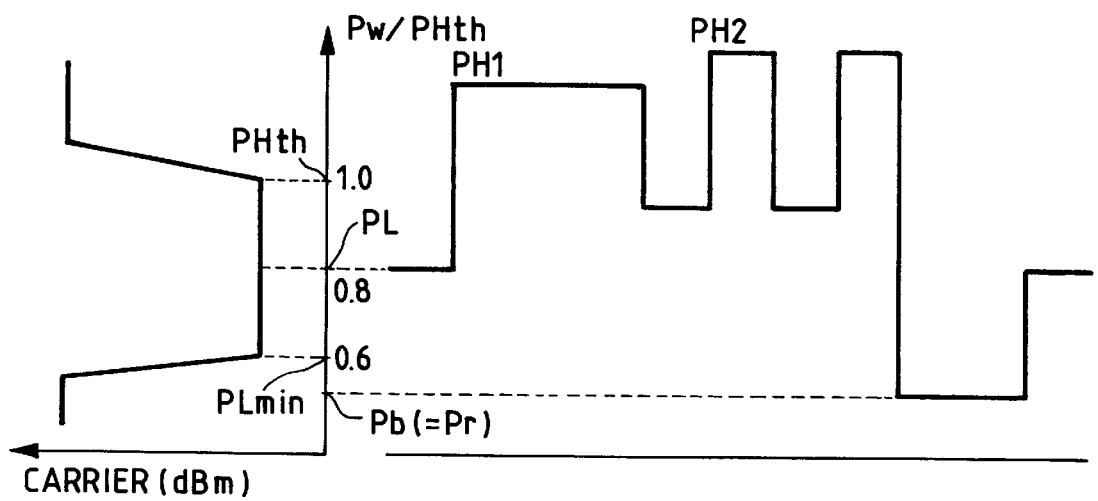
FIG. 7 is a chart showing the recording waveform used for a medium that satisfies PL<0.85×PHth in the embodiment shown in FIG. 4.
Figure 8:
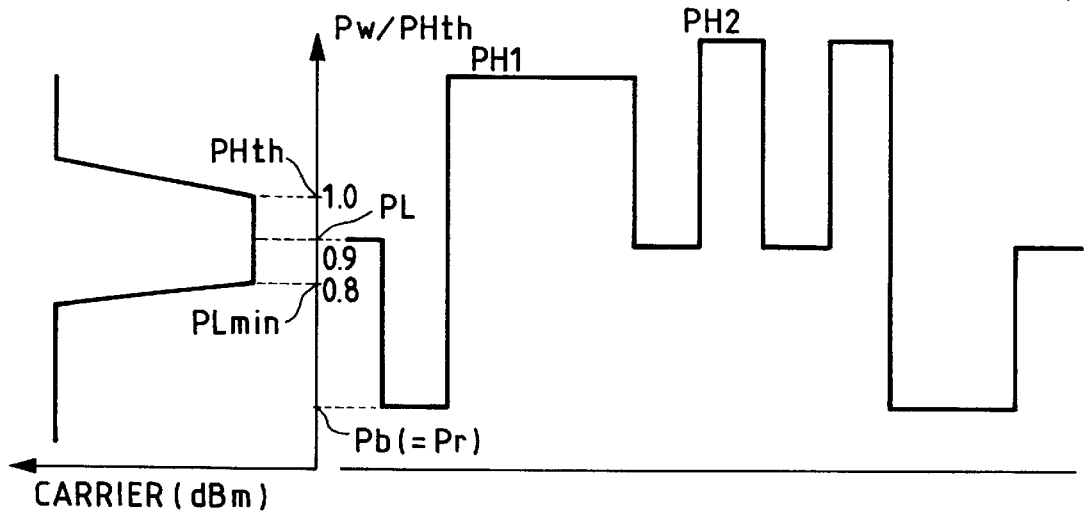
FIG. 8 is a chart showing the recording waveform used for a medium that satisfies PL>0.85×PHth in the embodiment shown in FIG. 4.

In this embodiment, the characteristics of a medium are measured before information recording, and a recording waveform suitable for the medium characteristics is selected based on the measurement result. In this embodiment, the recording waveform is selected depending on whether the medium has a small or large difference between PLmin and PHth, and the value PL is set to be an intermediate value between PLmin and PHth, as shown in FIGS. 7 and 8, in consideration of the margin for PL, as described above. More specifically, a recording waveform without any leading cooling gap is selected for a medium which satisfies PL=(PLmin+PHth)/2<0.85×PHth, as shown in FIG. 7, and a recording waveform with a leading cooling gap is selected for a medium which satisfies PL=(PLmin+PHth)/2>0.85× PHth, as shown in FIG. 8, thus recording information. Note that the present invention is not limited to "0.85" in the right-hand side of this conditional formula. Since this coefficient depends on the pulse width of a leading cooling gap, it can be appropriately determined based on the pulse width. In the following description, the waveform shown in FIG. 7 will be referred to as recording waveform 1, and the waveform shown in FIG. 8 will be referred to as recording waveform 2. Note that FIGS. 7 and 8 show the recording waveforms upon recording a 4T pattern.

Figure 9:
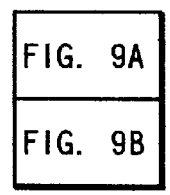
FIG. 9, which is comprised of FIGS. 9A and 9B, is a flow chart showing the operation of the embodiment shown in FIG. 4.
Figure 9A:
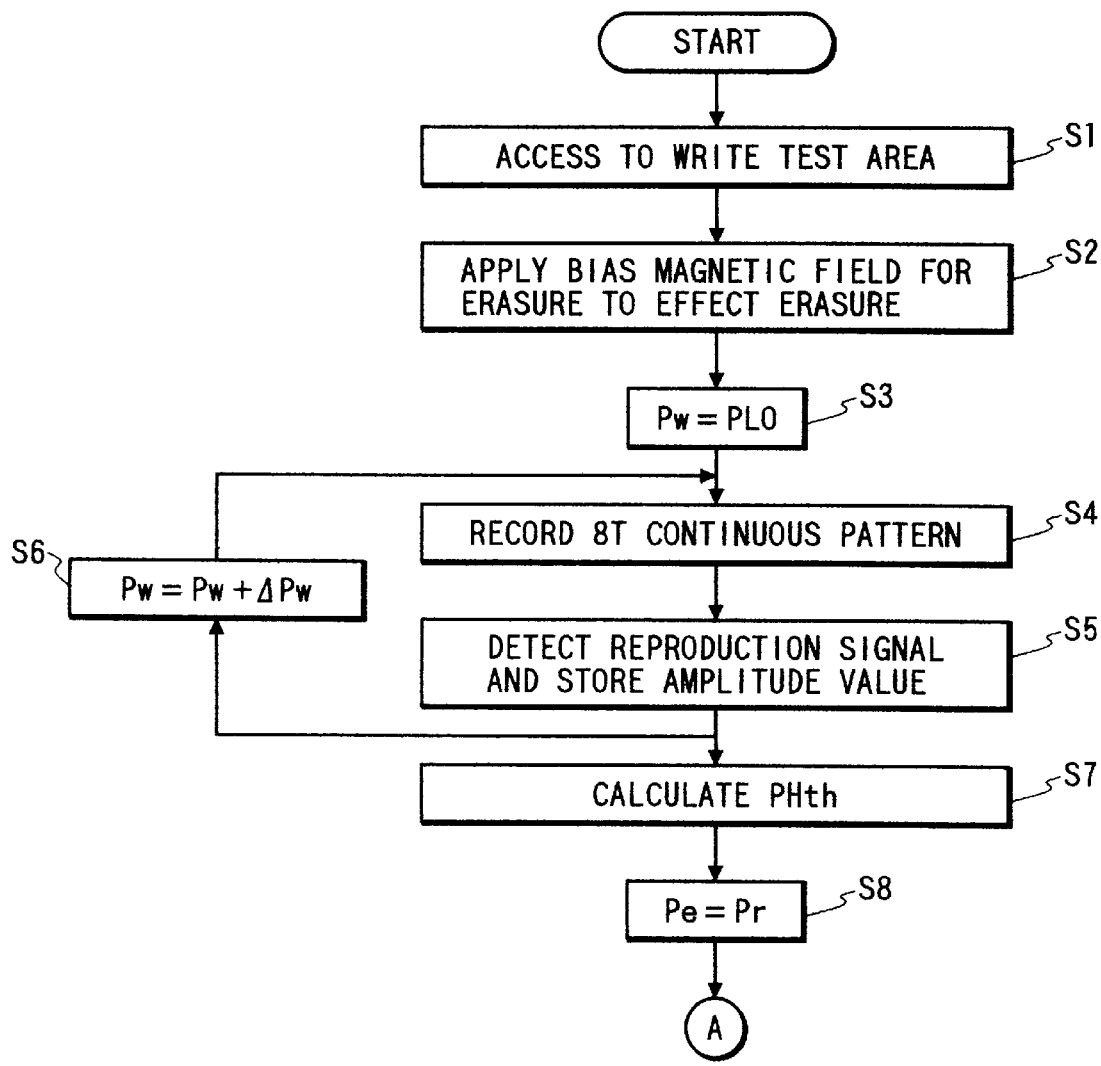

The detailed operation of this embodiment will be described below. FIGS. 9A and 9B are flow charts showing the flow of processing for selecting the recording waveform in correspondence with the medium characteristics, as described above. Note that the processing shown in FIGS. 9A and 9B is performed when the magnetooptical disk 1 (overwrite medium) is set in the apparatus, i.e., when the medium is exchanged. The processing of this embodiment roughly includes the following three steps.

(1) The power level PHth immediately before the beginning of the high-temperature level state of the overwrite medium is obtained.

(2) The minimum erasing power level PLmin at which a recorded pit can be completely erased is obtained.

(3) The setting value of PL is calculated based on the obtained values of PHth and PLmin, and a recording waveform is selected based on the calculation result.

The method of obtaining the power level PHth immediately before the beginning of the high-temperature level state of the overwrite medium in (1) will be described below. Referring to FIGS. 9A and 9B, when an overwrite medium is set in the apparatus, the CPU 18 controls the respective units to access the optical head 4 to a predetermined write test region on the medium (S1). Subsequently, the CPU 18 controls the drive circuit of the bias magnet 13 and the semiconductor laser drive circuit 19 to apply an erasing bias magnetic field to the write test region, and to scan an erasing light beam, thereby erasing the write test region (S2). Upon completion of erasing, the CPU 18 sets an initial value Pw of the recording power of the semiconductor laser 5 (S3). For example, the initial value of PL recorded on the control track of the magnetooptical disk 1 is used, and is set as the initial value Pw.

When the initial value of the recording power is determined, the CPU 18 records an 8T continuous pattern on the write test region using the power of the initial value (S4), and then reproduces the recorded 8T continuous pattern to detect the amplitude level of a reproduction signal (S5). The amplitude level of the reproduction signal is detected by the amplitude detection circuit 17. The obtained amplitude level is input into the CPU 18 via its internal A/D converter, and is then stored in an internal memory (S5). When the recording and reproduction using the initial value have ended, the CPU 18 increments the recording power by a predetermined amount by adding ΔPw to the recording power Pw (S6), records an 8T continuous pattern on the write test region again using the incremented recording power (S4), and reproduces it to detect and store the amplitude level of a reproduction signal (S5).

Figure 10:
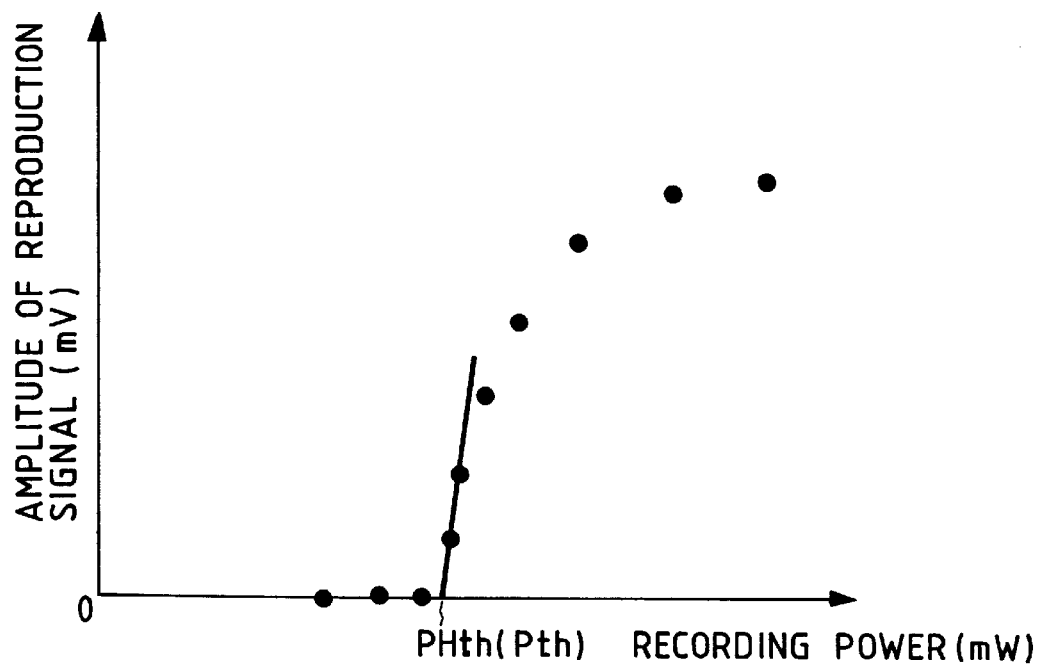
FIG. 10 is a graph for explaining the method of calculating a power level PHth immediately before the beginning of the high-temperature state in an overwrite medium and a power level Pth immediately before the beginning of recording in a non-overwrite medium.

When the processing in steps S4 to S6 is repeated and the recording power is incremented by a predetermined amount up to a predetermined recording power, data of the recording powers and the amplitudes of the reproduction signals can be obtained, as shown in FIG. 10. The predetermined recording power can be determined to be twice the initial value of PH recorded on the control track of the disk 1. Referring to FIG. 10, when the recording power is low, the amplitude of the reproduction signal is almost zero, but immediately rises from a certain recording power. The recording power at which the amplitude of the reproduction signal rises is the laser power level PHth to be obtained immediately before the beginning of the high-temperature level state. The CPU 18 obtains PHth based on the data of the recording powers and the amplitudes of the reproduction signals stored in the memory, and stores the obtained PHth in the memory (S7). In this manner, the processing for obtaining PHth in (1) ends. In this embodiment, as described above, (1–7) coding is used as the modulation method of recording information, and 8T as the longest bit in this method is used in the detection of PHth.

The method of obtaining the minimum erasing power level PLmin at which a recorded bit can be completely erased in (2) will be described below. The following description will also be made with reference to FIGS. 9A and 9B. The CPU 18 sets an initial value Pe of the erasing power to be a reproduction power Pr (S8). Subsequently, the CPU 18 records a 2T continuous pattern on the write test region using a recording power Pw=2×PHth (S9), and erases this 2T continuous pattern by scanning DC light with the previously set erasing power Pe on the pattern (S10). Furthermore, the CPU 18 detects and stores the amplitude level of a reproduction signal by reproducing a signal after the erasing process (S11). The amplitude level of this reproduction signal is also detected by the amplitude detection circuit 17. The detected amplitude level is assessed by the CPU 18 via the A/D converter, and is stored in the internal memory. Upon completion of the above processing, i.e., the recording process using the recording power Pw=2×PHth, the erasing processing using the erasing power of the initial value, and the reproduction process after the erasing process, the CPU 18 increases the erasing power by a predetermined amount by adding ΔPe to the erasing power Pe (S12), records a 2T continuous pattern on the write test region using the recording power Pw=2×PHth (S9), erases the 2T continuous pattern using the erasing power Pe+ΔPe (S10), and detects and stores the amplitude level of a reproduction signal by reproducing a signal after the erasing process (S11).

Figure 11:
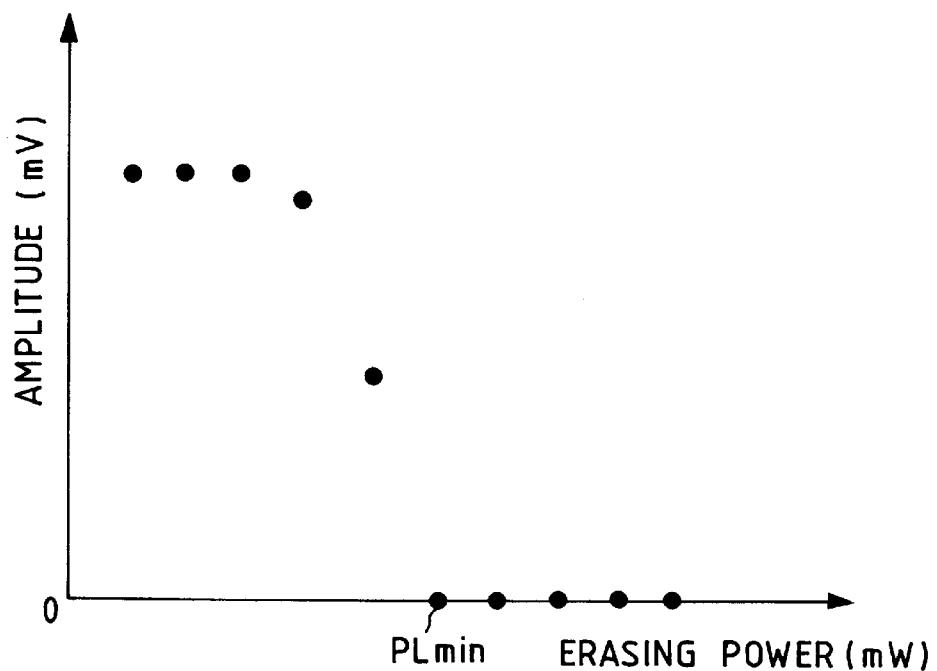
FIG. 11 is a graph for explaining the method of calculating a minimum erasing power level PLmin that can erase a pit recorded on an overwrite medium.

In this manner, when the processing in steps S9 to S12 is repeated and the erasing power is increased by a predetermined amount up to a predetermined erasing power, data of the relationship between the erasing power and the amplitude of the reproduction signal can be obtained, as shown in FIG. 11. The predetermined erasing power can be set to be, e.g., the value PHth obtained in (1) above. Referring to FIG. 11, when the erasing power is small, since the 2T continuous pattern is hardly erased, the amplitude of the reproduction signal has an almost constant amplitude level. However, the amplitude abruptly begins to fall from a given erasing power, and becomes zero at a predetermined erasing power. This amplitude of the reproduction signal is the minimum erasing power level PLmin at which a bit can be completely erased. The CPU 18 calculates PLmin from the data of the erasing powers and the amplitudes of reproduction signals stored in the memory, and stores it in the memory. In this manner, the processing for obtaining PLmin in (2) ends.

Finally, the method of calculating PL based on the values PHth and PLmin and selecting the recording waveform on the basis of the calculation result in (3) will be explained below. The CPU 18 calculates the value PL on the basis of the previously obtained PHth and PLmin. The value PL is assumed to be an intermediate value between PLmin and PHth, as described above, and is obtained by (PLmin+PHth)/2. Then, the CPU 18 compares the value PL with PHth×0.85 (S14), and selects the recording waveform depending on whether or not the value PL is larger than PHth×0.85. More specifically, the CPU 18 makes a comparison of PL=(PLmin+PHth)/2>0.85×PHth in step S14, and if PL<0.85×PHth holds (NO in step S14), since it is determined that the medium has a large difference between PLmin and PHth, and a recording waveform without any leading cooling gap is suitable for this medium, as described above, the CPU 18 selects recording waveform 1 shown in FIG. 7. On the other hand, if PL>0.85×PHth holds in step S14 (YES in step S14), since it is determined that the medium has a small difference between PLmin and PHth, and a recording waveform with a leading cooling gap is suitable for this medium, as described above, the CPU 18 selects recording waveform 2 shown in FIG. 8. In this manner, the CPU 18 selects a recording waveform matching the medium characteristics, and thereafter, records information on the medium using the selected waveform.

In the above embodiment, PHth and PLmin of an overwrite medium are detected, and the recording waveform is selected based on the detection results. If PHth and PLmin have already been recorded on the control track of a medium, the same processing may be performed by reading the recorded data. That is, PL is calculated based on the read values PHth and PLmin, and a recording waveform matching the medium characteristics can be selected based on the calculation result.

An embodiment when a non-overwrite medium is used will be described below. First, the suitable combination between the characteristics of a non-overwrite medium and the recording waveform will be explained. In a non-overwrite medium, recording is attained when a recording power that exceeds the recording power level is irradiated onto a recording medium. Some media have a recording power level relatively close to the reproduction signal level, but some other media have a recording power level relatively separated from the reproduction signal level, depending on their characteristics. The difference between the recording power level and the reproduction signal level can be expressed by the difference between a maximum reproduction power level Prmax at which a recorded pit is not erased, and a power level Pth immediately before the beginning of recording.

When recording is performed using a four-value multipulse waveform without any leading cooling gap, as shown in FIG. 2, the value Pas for the purpose of obtaining a preheat effect is preferably set to be an intermediate value between Prmax and Pth, in consideration of changes in ambient temperature and variations in laser power due to contamination of the medium or the objective lens, and the like. However, when the difference between Prmax and Pth is small, the value Pas becomes relatively close to the value Pth, a sharp leading edge of a recording pit cannot be formed, and jitter upon reproduction increases. In such a case, a leading cooling gap is preferably inserted before a four-value multi-pulse waveform, as shown in FIG. 3. However, the recording waveform shown in FIG. 3 is effective when the value Pas is close to the value Pth. When the value Pas is separated from the value Pth, the recording waveform shown in FIG. 2 is preferable in consideration of recording errors, adjacent track recording (crosstalk), and the like.

The present inventors conducted experiments to confirm the suitable combination between the medium characteristics and recording waveforms by actually performing recording on non-overwrite media using four-value multipulse recording waveforms shown in FIGS. 2 and 3. More specifically, using a medium satisfying Pas>0.85×Pth and a medium satisfying Pas<0.85×Pth, after predetermined signals were recorded on these media using the recording waveforms shown in FIGS. 2 and 3, the recorded signals were reproduced and jitter components were measured. As the experimental results, it was confirmed that the recording waveform with a leading cooling gap shown in FIG. 3 was suitable for the medium satisfying Pas>0.85×Pth, since it could assure a broader power margin. On the other hand, it was confirmed that the recording waveform without any leading cooling gap shown in FIG. 2 was suitable for the medium satisfying Pas<0.85×Pth since it could assure a broader power margin.

Figure 12:
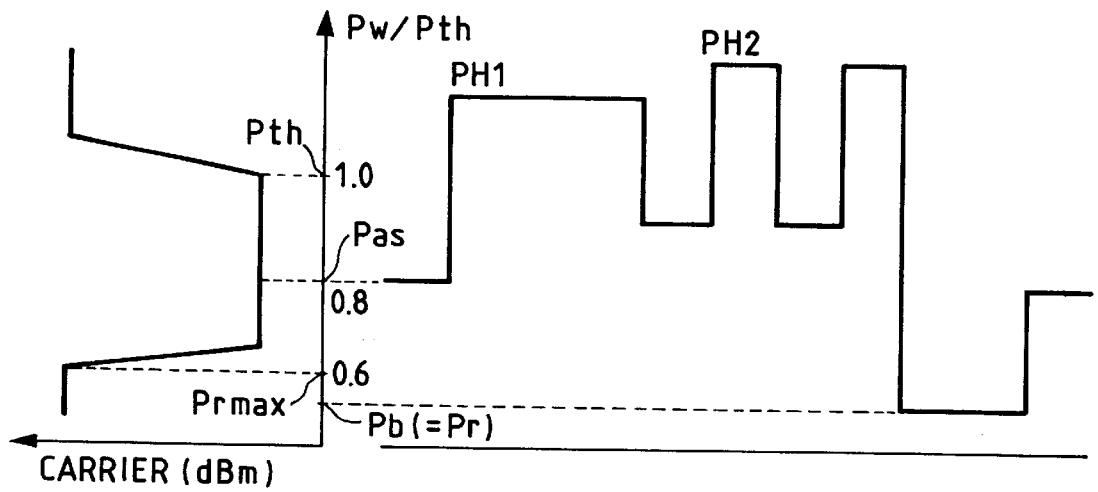
FIG. 12 is a chart showing the recording waveform used for a medium having Pas<0.85×Pth in another embodiment of the present invention using a non-overwrite medium.
Figure 13:
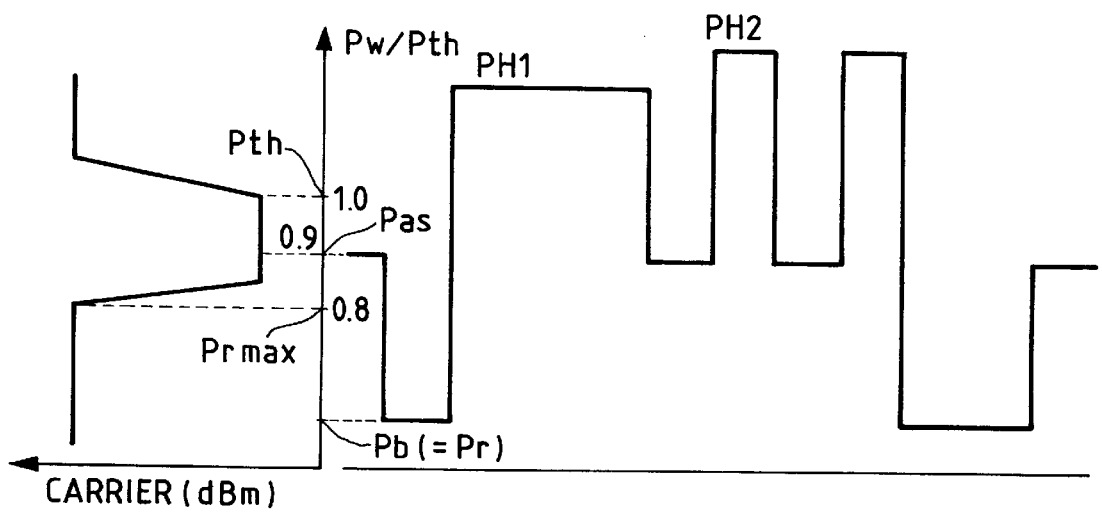
FIG. 13 is a chart showing the recording waveform used for a medium having Pas>0.85×Pth in the embodiment of the present invention using a non-overwrite medium.

In this embodiment as well, the characteristics of a non-overwrite medium are measured on the basis of the above-mentioned experimental results before information recording, and a recording waveform matching the medium characteristics is selected based on the measurement result. That is, the recording waveform is selected depending on whether the medium has a small or large difference between Prmax and Pth, and the value Pas is set to be an intermediate value between Prmax and Pth in consideration of its margin. More specifically, a recording waveform without any leading cooling gap shown in FIG. 12 is selected for a medium with a large difference between Prmax and Pth, i.e., a medium that satisfies Pas=(Prmax+Pth)/2<0.85×Pth; a recording waveform with a leading cooling gap shown in FIG. 13 is selected for a medium with a small difference between Prmax and Pth, i.e., a medium that satisfies Pas=(Prmax+Pth)/2>0.85×Pth, thus recording information. Note that the present invention is not limited to "0.85" in the right-hand side of this conditional formula. Since this coefficient depends on the pulse width of a leading cooling gap, it can be appropriately determined based on the pulse width. In the following description, the waveform shown in FIG. 12 will be referred to as recording waveform 1, and the waveform shown in FIG. 13 will be referred to as recording waveform 2. Note that FIGS. 12 and 13 show the recording waveforms upon recording a 4T pattern.

Figure 14:
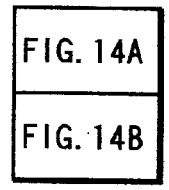
FIG. 14, which is comprised of FIGS. 14A and 14B, is a flow chart showing the operation of the embodiment of the present invention using a non-overwrite medium.
Figure 14A:
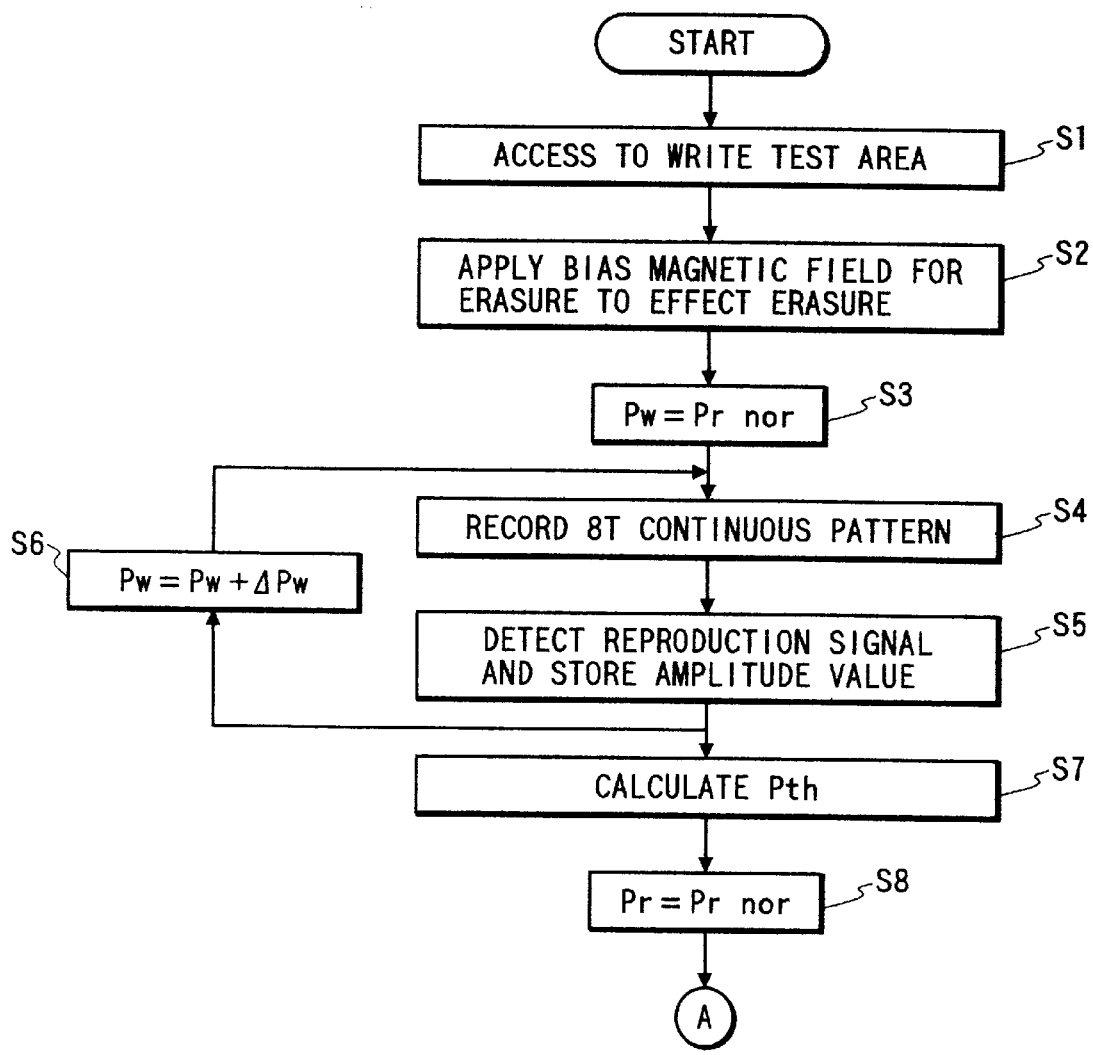

The detailed operation of this embodiment will be described below. FIGS. 14A and 14B are flow charts showing the flow of processing for selecting the recording waveform in correspondence with the medium characteristics. Assume that this processing is also performed when a non-overwrite medium is set in the apparatus. The processing of this embodiment roughly includes the following three steps.

(1) The power level Pth immediately before the beginning of recording of a non-overwrite medium is obtained.

(2) The maximum reproduction power level Prmax at which a pit recorded on a non-overwrite medium is not erased is obtained.

(3) The setting value of Pas is calculated based on the obtained values of Pt and Prmax, and a recording waveform is selected based on the calculation result.

The method of obtaining the power level Pth immediately before the beginning of recording in (1) will be explained below. Referring to FIGS. 14A and 14B, when a non-overwrite medium is set in the apparatus, the CPU 18 controls the optical head 4 to access a predetermined write test region on the medium (S1). Subsequently, the CPU 18 controls the drive circuit of the bias magnet 13 and the semiconductor laser drive circuit 19 to apply an erasing bias magnetic field to the write test region, and to scan an erasing light beam, thereby erasing the write test region (S2). Upon completion of erasing, the CPU 18 sets an initial value Pw of the recording power of the semiconductor laser 5 (S3). For example, a normal reproduction power Prnor is used as the initial value.

When the initial value of the recording power is determined, the CPU 18 records an 8T continuous pattern on the write test region using the recording power of the initial value (S4), and then reproduces the recorded 8T continuous pattern to detect the amplitude level of a reproduction signal (S5). The amplitude level of the reproduction signal is detected by the amplitude detection circuit 17. The obtained amplitude level is input into the CPU 18 via its internal A/D converter, and is then stored in the internal memory (S5). When the recording and reproduction using the initial value have ended, the CPU 18 increments the recording power by a predetermined amount by adding ΔPw to the recording power Pw (S6), records an 8T continuous pattern on the write test region again using the incremented recording power (S4), and reproduces it to detect and store the amplitude level of a reproduction signal (S5).

When the processing in steps S4 to S6 is repeated and the recording power is incremented by a predetermined amount up to a predetermined recording power, data of the recording powers and the amplitudes of the reproduction signals can be obtained, as shown in FIG. 10. The predetermined recording power can be determined to be twice the initial value of PH recorded on the control track of a medium. In FIG. 10, when the recording power is low, the amplitude of the reproduction signal is almost zero, but immediately rises from a certain recording power. The recording power at which the amplitude of the reproduction signal rises is the power level Pth immediately before the beginning of recording. The CPU 18 obtains Pth based on the data of the recording powers and the amplitudes of the reproduction signals stored in the memory, and stores the obtained PHth in the memory (S7). In this manner, the processing for obtaining PHth in (1) ends. In this embodiment as well, (1–7) coding is used as the modulation method of recording information, and 8T as the longest bit at that time is used in the detection of the reproduction signal.

The method of obtaining the maximum reproduction power level Prmax at which a recorded pit is not erased in (2) will be described below. The CPU 18 sets an initial value Pr of the reproduction power to be a normal reproduction power Prnor (S8). Subsequently, the CPU 18 controls the respective units to record a 2T continuous pattern on the write test region using a recording power Pw=2×Pth (S9), and repeats reproduction by scanning DC light with the previously set reproduction power on the recorded pattern about 1,000 times (about several tens of seconds although this depends on the rotational speed of the medium (S10). More specifically, in order to confirm whether or not the recorded pattern is erased, reproduction light is scanned about 1,000 times.

Upon completion of the predetermined number of times of reproduction, the CPU 18 reproduces the recorded pattern using the normal reproduction power Prnor (S11), and detects and stores its amplitude level (S12). The amplitude level of the reproduction signal is also detected by the amplitude detection circuit 17. The detected amplitude level is similarly input into the CPU 18 via the A/D converter, and is stored in the internal memory (S12). Upon completion of the recording process using the recording power Pw=2×Pth, about 1,000 repetitions of the reproduction process using the reproduction power of the initial value, and the amplitude detection of a signal reproduced using the normal reproduction power, the CPU 18 increases the reproduction power by adding ΔPr to the reproduction power Pr (S13), records a 2T continuous pattern on the write test region again using the recording power Pw=2×Pth (S9), and reproduces the recorded pattern about 1,000 times using the power Pr+ΔPr (S10). Thereafter, the CPU 18 also reproduces the recorded pattern using the normal reproduction power Prnor (S11), and detects and stores its amplitude level (S12).

Figure 15:
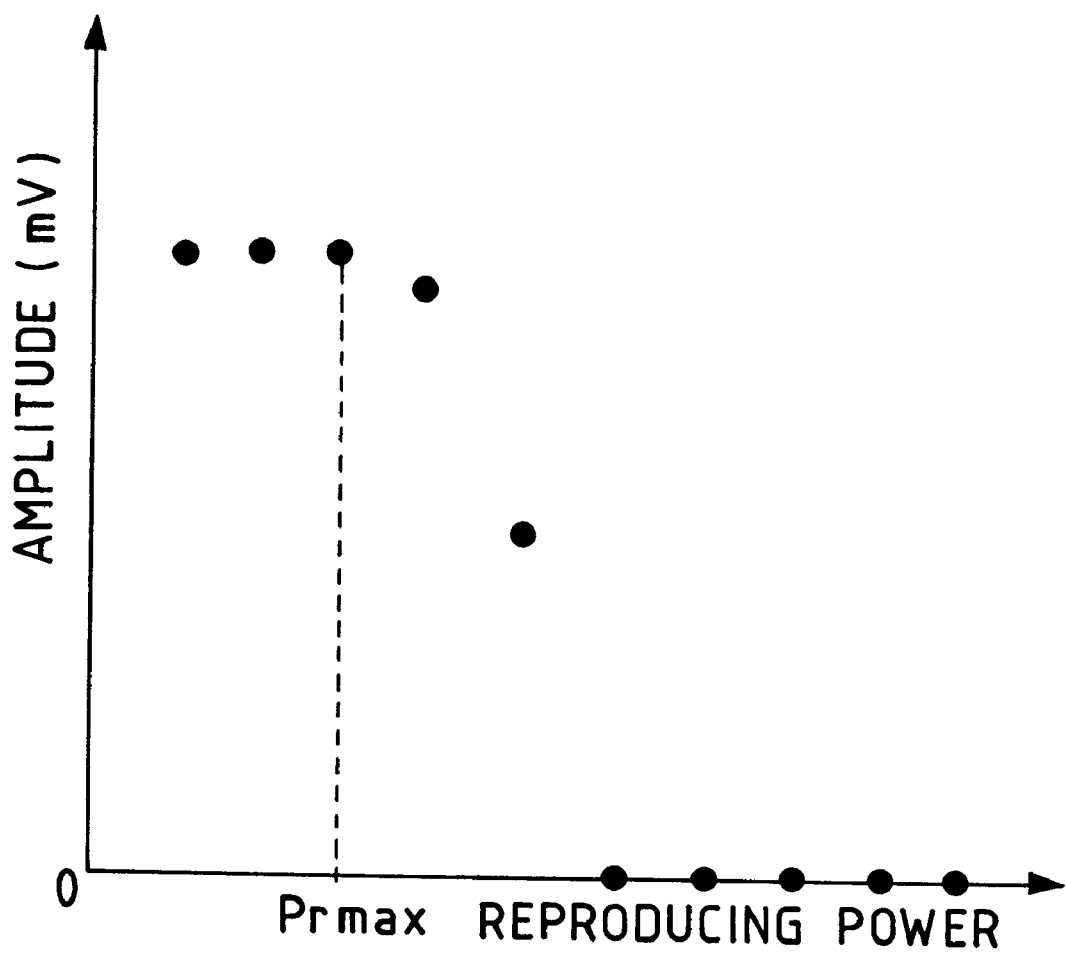
FIG. 15 is a graph for explaining the method of calculating a maximum reproduction power level Prmax at which a pit recorded on a non-overwrite medium is not erased.

In this manner, when the processing in steps S9 to S12 is repeated and the reproduction power is increased by a predetermined amount up to a predetermined reproduction power, data of the relationship between the reproduction power and the amplitude of the reproduction signal can be obtained, as shown in FIG. 15. The predetermined reproduction power can be set to be, e.g., the value Pth obtained in (1) above. Referring to FIG. 15, when the reproduction power is low, since the 2T continuous pattern is not erased, the amplitude of the reproduction signal changes little and has an almost constant amplitude level. However, the amplitude abruptly begins to fall from a given reproduction power, and becomes zero at a predetermined reproduction power. This amplitude of the reproduction signal is the maximum reproduction power level Prmax at which a recorded bit is not erased. The CPU 18 calculates Prmax from the data of the reproduction powers and the amplitudes of reproduction signals stored in the memory, and stores it in the memory (S14). In this manner, the processing for obtaining Prmax in (2) ends.

Finally, the method of calculating the setting value of Pas based on the values Pth and Prmax and selecting the recording waveform on the basis of the calculation result in (3) will be explained below. The CPU 18 calculates the value Pas on the basis of the previously obtained values Pth and Prmax. The value Pas is assumed to be an intermediate value between Pth and Prmax, as described above, and is obtained by Pas=(Prmax+Pth)/2. Then, the CPU 18 compares the value Pas with Pth×0.85 (S15), and selects the recording waveform depending on whether or not the value Pas is larger than Pth×0.85. More specifically, the CPU 18 makes a comparison of Pas=(Prmax+Pth)/2>0.85×Pth in step S15, and if Pas<0.85×PHth holds (NO in step S15), since it is determined that the medium has a large difference between Pth and Prmax, and a recording waveform without any leading cooling gap is suitable for this medium, as described above, the CPU 18 selects recording waveform 1 shown in FIG. 12. On the other hand, if Pas>0.85×Pth holds (YES in step S15), since it is determined that the medium has a small difference between Pth and Prmax, and a recording waveform with a leading cooling gap is suitable for this medium, as described above, the CPU 18 selects recording waveform 2 shown in FIG. 13. In this manner, the CPU 18 selects a recording waveform matching the medium characteristics, and thereafter, records information on the medium using the selected waveform.

In this embodiment as well, Pth and Prmax of a non-overwrite medium are detected, and the recording waveform is selected based on the detection results. However, when Pth and Prmax have already been recorded on the control track of a non-overwrite medium, the same processing may be performed by reading them and a recording waveform matching the medium characteristics may be selected.

As described above, according to the present invention, since the recording waveform is selected on the basis of the power level immediately before the beginning of the high-temperature level state of an overwrite medium and the minimum erasing power at which a recorded pit can be completely erased, information can be recorded using an optimal recording waveform corresponding to the medium characteristics. Therefore, recording bits can be accurately and stably recorded without leaving any unerased portion while reducing jitter upon reproduction, independently of the medium characteristics. In a non-overwrite medium as well, since the recording waveform is selected on the basis of the power level immediately before the beginning of recording and the maximum reproduction power level at which a recorded bit is not erased, information can be similarly recorded using an optimal recording waveform corresponding to the medium characteristics. Therefore, recording bits can be accurately and stably recorded independently of the medium characteristics.

What is claimed is:

1. An optical information recording/reproducing apparatus for recording information by selectively forming a high-temperature level state and a low-temperature level state on a recording medium of an optical modulation overwrite type, upon irradiating, onto the medium, a light beam, which is intensity-modulated to multi-value power levels on the basis of a multi-pulse recording waveform, said apparatus comprising:

detecting means for detecting a power level PHth of the light beam at which the high-temperature level state begins to be formed on the medium and a minimum power level PLmin of the light beam, which forms the low-temperature level state on the medium; and switching means for switching multi-pulse recording waveforms between a case in which a difference between the power level PHth and the power level PLmin is large and a case in which the difference is small.

2. An apparatus according to claim 1, wherein the multi-pulse recording waveforms include two different waveforms including a waveform having a cooling gap only after a power level PH of the light beam, which forms the high-temperature level state, and a waveform having cooling gaps before and after the power level PH.

3. An apparatus according to claim 1, wherein a predetermined signal is recorded while changing a power level PH of the light beam, which forms the high-temperature level state, the recorded signal is reproduced, and said detecting means detects the power level PHth based on an amplitude of the reproduction signal and the power level PH.

4. An apparatus according to claim 1, wherein a predetermined signal is recorded on a predetermined region of the medium, the recorded signal is erased while changing a power level PL of the light beam, which forms the low-temperature level state, the signal in the predetermined region after the erasing process is reproduced, and said detecting means detects the power level PLmin on the basis of an amplitude of the reproduction signal and the power level PL.

5. An apparatus according to claim 1, wherein said switching means switches the multi-pulse recording waveforms on the basis of a relationship between {(PHth+PLmin)/2} and (0.85*PHth).

6. An optical information recording/reproducing apparatus for recording information by selectively forming a high-temperature level state and a low-temperature level state on a non-overwrite type recording medium upon irradiating, onto the medium, a light beam, which is intensity-modulated to multi-value power levels on the basis of a multi-pulse recording waveform, said apparatus comprising:

detecting means for detecting a power level Pth of the light beam at which recording begins on the medium, and a maximum reproduction power level Prmax of the light beam, at which information recorded on the medium is not erased; and switching means for switching multi-pulse recording waveforms between a case in which a difference between the power level Pth and the power level Prmax is large and a case in which the difference is small.

7. An apparatus according to claim 6, wherein a predetermined signal is recorded while changing a power level PH of the light beam, the recorded signal is reproduced, and said detecting means detects the power level Pth based on an amplitude of the reproduction signal and the power level PH.

8. An apparatus according to claim 6, wherein a predetermined signal is recorded on a predetermined region of the medium, the recorded signal is reproduced while changing a reproduction power level Pr of the light beam, and said detecting means detects the power level Prmax on the basis of an amplitude of the reproduction signal and the power level Pr.

9. An apparatus according to claim 6, wherein said switching means switches the multi-pulse recording waveforms on the basis of a relationship between {(Prmax+Pth)/2} and (0.85*Pth).

10. An optical information recording/reproducing method for recording information by selectively forming a high-temperature level state and a low-temperature level state on a recording medium of an optical modulation overwrite type, upon irradiating, onto the medium, a light beam, which is intensity-modulated to multi-value power levels on the basis of a multi-pulse recording waveform, said method comprising the steps of:

detecting a power level PHth of the light beam at which the high-temperature level state begins to be formed on the medium, and a minimum power level PLmin of the light beam, which forms the low-temperature level state on the medium; and switching multi-pulse recording waveforms between a case in which a difference between the power level PHth and the power level PLmin is large and a case in which the difference is small.

11. An optical information recording/reproducing method for recording information by selectively forming a high-temperature level state and a low-temperature level state on a non-overwrite type recording medium upon irradiating, onto the medium, a light beam, which is intensity-modulated to multi-value power levels on the basis of a multi-pulse recording waveform, said method comprising the steps of:

detecting a power level Pth of the light beam at which recording begins on the medium, and a maximum reproduction power level Prmax of the light beam, at which information recorded on the medium is not erased; and switching multi-pulse recording waveforms between a case in which a difference between the power level Pth and the power level Prmax is large and a case in which the difference is small.

12. An apparatus according to claim 6, wherein said switching means switches a multi-pulse recording waveform having only a trailing cooling gap and a multi-pulse recording waveform having leading and trailing cooling gaps.

* * * * *

UNITED STATES PATENT AND TRADEMARK OFFICE
CERTIFICATE OF CORRECTION

PATENT NO. : 5,905,695

DATED : May 18, 1999

INVENTOR : SHUNPEI KIMURA

It is certified that error appears in the above-identified patent and that said Letters Patent is hereby corrected as shown below:

COLUMN 9:

line 30, "theme-" should read --the me- --; and
line 56, "3.6, mW" should read --3.6 mW,--.

COLUMN 11:

line 49, "assessed" should read --accessed--.

Signed and Sealed this

Eighteenth Day of January, 2000

Attest:

Q. TODD DICKINSON

Attesting Officer    Commissioner of Patents and Trademarks